United States Patent
Kosak et al.

(10) Patent No.: US 7,228,493 B2
(45) Date of Patent: Jun. 5, 2007

(54) SERVING CONTENT TO A CLIENT

(75) Inventors: Donald M. Kosak, Sudbury, MA (US); Michael J. Witbrock, Newton, MA (US)

(73) Assignee: Lycos, Inc., Waltham, MA (US)

( * ) Notice: Subject to any disclaimer, the term of this patent is extended or adjusted under 35 U.S.C. 154(b) by 511 days.

(21) Appl. No.: 09/803,540

(22) Filed: Mar. 9, 2001

(65) Prior Publication Data

US 2002/0129063 A1 Sep. 12, 2002

(51) Int. Cl.
*G06F 15/00* (2006.01)
(52) U.S. Cl. ................................................. 715/500
(58) Field of Classification Search ............ 715/501.1, 715/513, 500; 707/3
See application file for complete search history.

(56) References Cited

U.S. PATENT DOCUMENTS

| | | | | |
|---|---|---|---|---|
| 5,530,852 A * | 6/1996 | Meske et al. ............... | 709/206 |
| 5,778,363 A * | 7/1998 | Light ............................ | 707/5 |
| 5,930,788 A * | 7/1999 | Wical ........................... | 707/5 |
| 6,009,441 A * | 12/1999 | Mathieu et al. ............. | 715/516 |
| 6,085,220 A * | 7/2000 | Courts et al. ............... | 709/201 |
| 6,101,472 A * | 8/2000 | Giangarra et al. .......... | 704/275 |
| 6,144,991 A * | 11/2000 | England ....................... | 709/205 |
| 6,178,432 B1 * | 1/2001 | Cook et al. .................. | 715/513 |
| 6,279,013 B1 * | 8/2001 | LaMarca et al. ............ | 715/500 |
| 6,304,864 B1 * | 10/2001 | Liddy et al. ................. | 706/15 |
| 6,330,592 B1 * | 12/2001 | Makuch et al. ............. | 709/217 |
| 6,389,412 B1 * | 5/2002 | Light ............................ | 707/3 |
| 6,470,349 B1 * | 10/2002 | Heninger et al. ........... | 707/102 |
| 6,510,558 B1 * | 1/2003 | Iinuma et al. ............... | 725/113 |
| 6,606,525 B1 * | 8/2003 | Muthuswamy et al. ........ | 700/52 |
| 6,622,168 B1 * | 9/2003 | Datta .......................... | 709/219 |
| 6,625,803 B1 * | 9/2003 | Massena et al. ............ | 717/100 |
| 6,636,863 B1 * | 10/2003 | Friesen ....................... | 707/102 |
| 6,691,106 B1 * | 2/2004 | Sathyanarayan ................ | 707/3 |
| 6,718,313 B1 * | 4/2004 | Lent et al. .................... | 705/38 |
| 6,769,025 B1 * | 7/2004 | Alles et al. .................. | 709/225 |
| 6,886,013 B1 * | 4/2005 | Beranek ....................... | 707/10 |
| 7,127,670 B2 * | 10/2006 | Bendik ........................ | 715/500 |
| 2001/0020956 A1 * | 9/2001 | Moir ........................... | 345/765 |
| 2001/0021914 A1 * | 9/2001 | Jacobi et al. .................. | 705/8 |
| 2001/0043364 A1 * | 11/2001 | Messner et al. ............ | 358/1.15 |
| 2001/0049620 A1 * | 12/2001 | Blasko ........................ | 705/10 |
| 2001/0054085 A1 * | 12/2001 | Kurganov .................... | 709/218 |
| 2002/0002563 A1 * | 1/2002 | Bendik ........................ | 707/500 |
| 2002/0010725 A1 * | 1/2002 | Mo .............................. | 707/530 |
| 2002/0010753 A1 * | 1/2002 | Matsuoka et al. .......... | 709/217 |
| 2002/0032701 A1 * | 3/2002 | Gao et al. ................... | 707/513 |
| 2002/0059342 A1 * | 5/2002 | Gupta et al. ................ | 707/512 |
| 2002/0073125 A1 * | 6/2002 | Bier ............................ | 707/530 |
| 2002/0083123 A1 * | 6/2002 | Freedman et al. .......... | 709/203 |

(Continued)

OTHER PUBLICATIONS

Schreft et al., Self-Maintaining Web Pages—An Overview, IEEE 2001, pp. 83-90.*

(Continued)

*Primary Examiner*—Cong-Lac Huynh
(74) *Attorney, Agent, or Firm*—Fish & Richardson P.C.

(57) ABSTRACT

A method includes scanning content of a web page in which a web component is to be inserted, inferring a profile from the scanned content and serving the web component in the web page according to the profile.

28 Claims, 3 Drawing Sheets

U.S. PATENT DOCUMENTS

| | | | |
|---|---|---|---|
| 2002/0091725 A1* | 7/2002 | Skok | 707/501.1 |
| 2002/0107894 A1* | 8/2002 | Kent et al. | 707/517 |
| 2002/0111972 A1* | 8/2002 | Lynch et al. | 707/523 |
| 2002/0123334 A1* | 9/2002 | Borger et al. | 455/419 |
| 2002/0138331 A1* | 9/2002 | Hosea et al. | 705/10 |
| 2002/0138513 A1* | 9/2002 | Korotney et al. | 707/511 |
| 2002/0161803 A1* | 10/2002 | Shelton | 707/528 |
| 2002/0165881 A1* | 11/2002 | Shelton | 707/526 |
| 2003/0017440 A1* | 1/2003 | Bergey et al. | 434/262 |
| 2003/0041143 A1* | 2/2003 | Ronald et al. | 709/224 |
| 2003/0050995 A1* | 3/2003 | Mateos | 709/217 |
| 2003/0091229 A1* | 5/2003 | Edge et al. | 382/162 |
| 2003/0110449 A1* | 6/2003 | Wolfe | 715/522 |
| 2003/0149580 A1* | 8/2003 | Moores et al. | 705/1 |
| 2003/0196169 A1* | 10/2003 | Wittkotter et al. | 715/513 |
| 2003/0204610 A1* | 10/2003 | Howard et al. | 709/229 |
| 2005/0050460 A1* | 3/2005 | Bedingfield, Sr. | 715/513 |
| 2006/0020673 A1* | 1/2006 | Sorge et al. | 709/206 |

OTHER PUBLICATIONS

Lee et al., Information Integration with Attribution Support for Corporate Profiles, ACM 1999, pp. 423-429.*

Abdelzaher, An Automated Profiling Subsystem for QoS-Aware Services, IEEE 2000, pp. 1-10.*

Marshall, LivePublish Delivers Tailored Web Content, InfoWorld: Nov. 29, 1999, p. 1 (ProQuest)..*

Solomon, Quest to Customize Content, Computing Canada Mar. 17, 2000, p. 1 (ProQuest ).*

\* cited by examiner

SERVING CONTENT TO A CLIENT

BACKGROUND

This invention relates to serving content to a client

Content may be served, for example, in web pages, which are adapted text and graphics documents that a user views utilizing a web browser such as Netscape Navigator® and Internet Explorer®. The documents are constructed using HyperText Markup Language ("HTML"). HTML is composed of a set of elements that define a document and guide its display.

SUMMARY

In general, in one aspect, the invention features a method including scanning content of a web page or site in which a web component is to be inserted, inferring a profile from the scanned content and serving the web component in the web page according to the profile. This aspect may include one or more of the following features.

In implementations of the invention, the web page and the component include HyperText Markup Language (HTML). The content includes contextual material including topical, geographical, temporal and semantic characteristics. The component may include syndicated services including message boards, chat rooms, file exchanges, link exchanges, E-commerce and auctions.

The component may include syndicated content including news feeds, weather information, stock information, road maps, pictures, video, audio and text.

The profile includes a format of the scanned content and a topic of the scanned topic. The component includes embedded elements such as in-situ syndicated textual or multimedia material shown within a context of the web page.

Serving includes script insertion, inserting frames, iframes, layers, applets, active-x controls and plugins.

The embedded element may include a standalone element such as syndicated textual or multimedia material shown within its own context in a browser window, dialog window or pop-up window.

Scanning includes analyzing a site format of the content, analyzing a site content of the content and saving the site format and the site content as a profile. The profile is utilized as the profile and the profile may be utilized in real-time each time a component is displayed to a user.

Serving may include checking the web page for updates and updating the profile in response to checking, where checking can include comparing expiry information, last modified dates, cyclic redundancy codes (CRCs) or MD5s, i.e., algorithms used to verify data integrity through the creation of a 128-bit message digest from data input. Cyclic redundancy checking is a method of checking for errors in data that has been transmitted on a communications link. A sending device applies a 16- or 32-bit polynomial to a block of data that is to be transmitted and appends the resulting CRC to the block. The receiving end applies the same polynomial to the data and compares its result with the result appended by the sender. If they agree, the data has been received successfully. If not, the sender can be notified to resend the block of data.

Other features and advantages of the invention will become apparent from the following description, including the claims and drawings.

DETAILED DESCRIPTION

Figure 1:
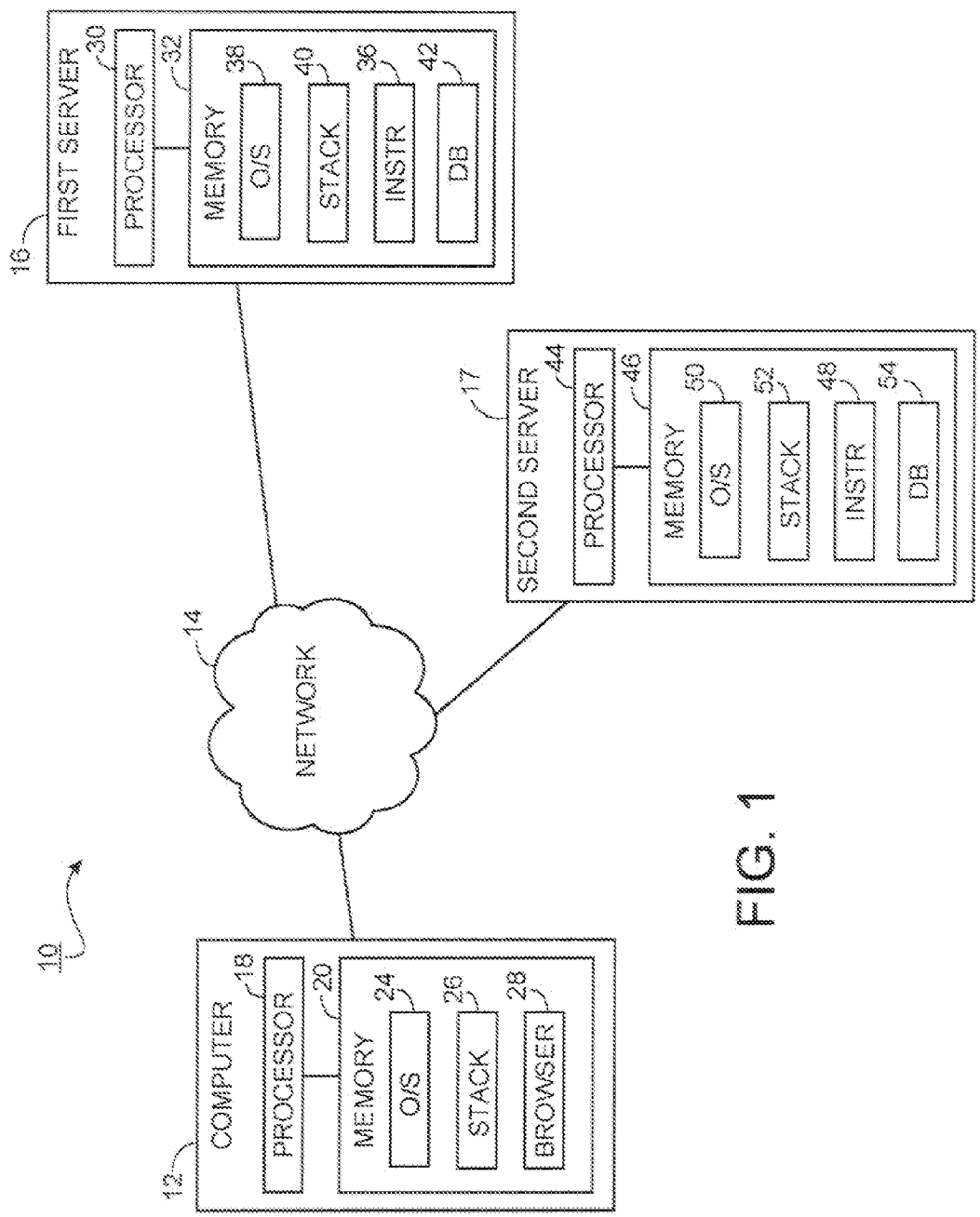
FIG. 1 is a view of a computer network.

In FIG. 1, a system 10 includes a computer 12, such as a personal computer (PC). Computer 12 is connected to a network 14, such as the Internet, that runs TCP/IP (Transmission Control Protocol/Internet Protocol) or another suitable protocol. Connections may be via Ethernet, wireless link, telephone line, or the like. Network 14 contains a first server 16 and a second server 17, each of which may be a mainframe computer, a PC, or any other type of processing device.

Computer 12 contains a processor 18 and a memory 20. Memory 20 stores an operating system ("OS") 24 such as Windows98®, a TCP/IP protocol stack 26 for communicating over network 14, and a Web browser 28, such as Internet Explorer® or Netscape Navigator®, for accessing Web sites and pages hosted and served by devices on network 14.

First server 16 contains a processor 30 and a memory 32. Memory 32 stores machine-executable instructions 36, OS 38, TCP/IP protocol stack 40, and database 42 containing user accessible Web content, e.g., Web pages. Database 42 is described below. Instructions 36 may be part of an Internet search engine or not, and are executed by processor 30 to perform process 70 below. That is, a user at computer 12 uses Web browser 28 to access first server 16, which, in response, executes instructions 36 to perform the process described below.

Second server 17 contains a processor 44 and a memory 46. Memory 46 stores machine-executable instructions 48, OS 50, TCP/IP protocol stack 52, and database 54 containing Web components (e.g., content) accessible by the first server 16. Database 54 is described below.

Figure 2:
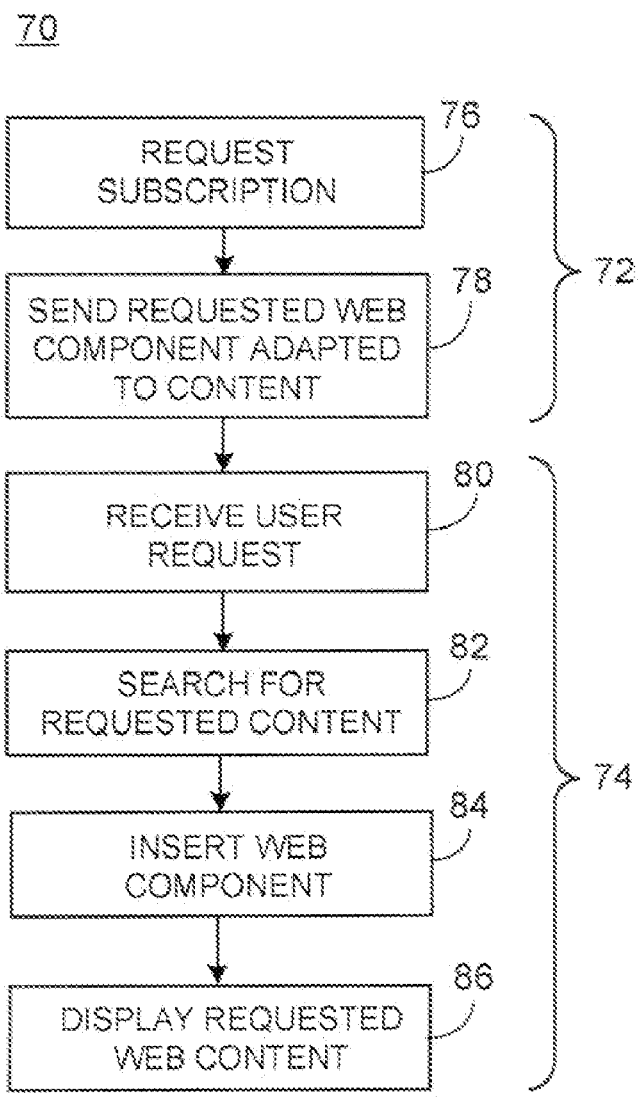
FIG. 2 is a flowchart showing a process for provider information to a user.

Referring to FIG. 2, a process 70 is shown for providing useful information from the first server 16, such as Web content, to a user that includes an additional web component or components from one or more secondary sources, such as the second server 17, adapted and inserted into the useful information. Example additional web components are syndicated content and syndicated services that are made available to subscriber sites, such as first server 16, from database 54 of the second server 17. Examples of syndicated content in the database 54 are news feeds, weather information, stock information, road maps, pictures, audio, video and text. Examples of syndicated services contained in the database 54 are message boards, chat rooms, file exchanges, link exchanges, E-commerce, auctions, and so forth.

Process 70 includes a pre-processing phase 72 and a run-time phase 74. During pre-processing phase 72, process 70 requests (76), in conjunction with specific Web content residing in its database 42, subscription to one or more web components, e.g., syndicated content and/or syndicated services, resident in the database 54 of the second server 17 or externally via the network 14. In response to the request (76), the second server 17 sends (78) a web component to the first server 16. The web component is adapted to the first server 16 by the second server 17 to the specific Web content residing in database 42. In this context, "adapted" refers to a process by which at least the format and content of the specific Web content are determined and utilized to generate a profile. The profile is used by the second server 17 to format the requested web component in the database 54 for insertion into the specific web content in the database 42 for storage and/or display to a user.

During run-time phase 74, process 70 receives (80) a request for specific web content from a user. The request may be direct input of a universal resource locator (URL) by the user. Alternatively the request may be the result of the user directing their browser software to load the specific web content as part of a response to a search.

Process 70 searches (82) its database 42 for the requested specific web content. When the requested specific web content is located, the process 70 inserts (84) an additional web component from the database 54 of the second server 17 prior to serving the specific web content to the user. Process 70 displays (86) the specific web content with the additional adapted web component to the user on computer 12.

Figure 3:
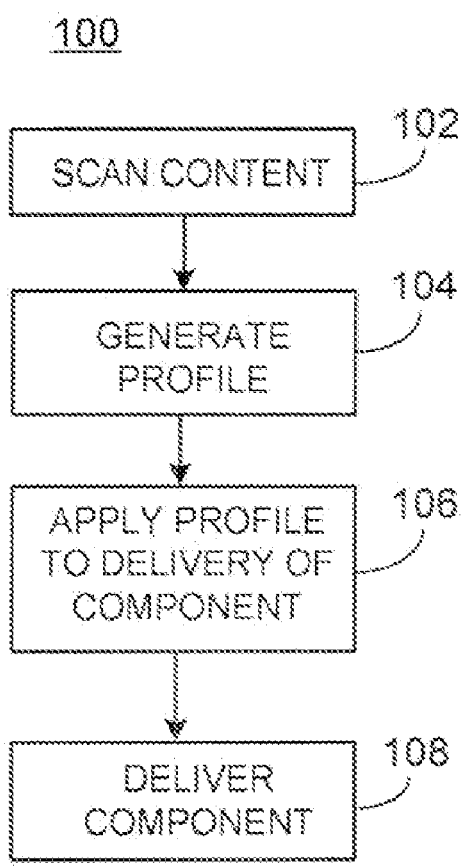
FIG. 3 is a flowchart showing an adaptation process.

Referring to FIG. 3, a process 100 for adapting a web component to specific content resides in the memory 46 of the second server 17. Process 100 includes scanning (102) the specific web content contained in the database 42 of the first server. Web content in the database 42 is composed of HyperText Markup Language (HTML), Style Sheets, XML, CSS, XSL, PDF and other machine-readable content such as digital images or text.

Using HTML as an example, HTML is a language of elements that are used to define a document and guide its display. HTML documents are plain-text (also known as ASCII) files that can be composed using any text editor. An element is a fundamental component of the structure of a text document. Examples of elements are heads, tables, paragraphs, and lists. HTML uses tags to denote elements contained in the document. Some elements may include one or more attributes. An attribute is additional information that is included in a smart tag. For example, one can specify the alignment of images, e.g., top, middle, bottom, by including the appropriate image source HTML code. Other attributes may be specified. For example, background color may be specified to match a color of text font, and external images, sounds, and animations may be incorporated. Document style, colors, background, background images, table characteristics, fonts, margins, and other visual characteristic may be specified in the document.

Style Sheets allow an HTML author to separate presentation definitions from content in HTML documents. HTML was designed primarily as a content-based mark up language. Styles are defined and then applied to blocks of text (or even single characters) by referring to the definition in the available style range. An example of a simple form of style sheet could be: P {color: #800000}. This would cause any text that is classified as a paragraph to be rendered using a dark red color.

Style definitions can be applied to documents and their elements in one of four ways, i.e., using the <LINK> attribute to point to an external style sheet, using the <STYLE> element within the <HEAD> of a document, using the @import mechanism (similar to the <LINK> method above, this allows the importing of external style sheets.), and using the STYLE attribute in an element. This last way is allowed for any elements allowed within the <BODY> of a HTML document. There are various methods for denoting the style declaration and all use separate methods within HTML to determine the style to be used.

The process 100 generates (104) a profile representative of at least the format and style of the specific web content. More specifically, the profile represents the style, colors, background, background images, table characteristics, fonts, margins, and other visual characteristics that are specified in the specific web content. The profile may represent an automatically derivable description of the specific web content. For example, determining the writing style of the content and making selections in response to the determination, e.g., formal and informal presentations of embedded news stories. Further, the language in which the content is written may be determined, and subsequently selecting or translating the component into that language, or decorating it with culturally appropriate symbols may be included. Content refers to contextual material of the specific web content including topical, geographical, temporal and semantic. The profile includes style, colors, background, background images, table characteristics, fonts, margins, and other visual characteristics associated with the specific web content. The profile is stored and maintained in database 54 along with an identifier that associates the profile with the specific web content.

The process applies (106) the profile to the delivery of a component, such as syndicated services and/or syndicated content, contained in the database 54 and delivers (108) the component. Specifically, the component is modified in accordance with the profile so as to seamlessly "fit" in the specific web content as if it originated from a single source.

The component may include an embedded element and/or a standalone element. Embedded elements are in-situ syndicated textual or multimedia material shown within the context of the specified web content. Utilizing one or more methods, such as script insertion, frames, interior frames (I-frames, layers, applets, active-x controls, plugins, and so forth) may accomplish this. Standalone elements are syndicated textual or multimedia material shown within their own contexts in a browser window, dialog window, pop-up window, and so forth.

Processes 70 and 100 are not limited to use with the hardware/software configuration of FIG. 1; they may find applicability in any computing or processing environment. Processes 70 and may be implemented in hardware (e.g., an ASIC {Application-Specific Integrated Circuit} and/or an FPGA {Field Programmable Gate Array}), software, or a combination of hardware and software.

Processes 70 and 100 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 70 and 100.

Processes 70 and 100 may also be implemented as a computer-readable storage medium, configured with a computer program, where, upon execution, instructions in the computer program cause the computer to operate in accordance with processes 70 and 100.

The invention is not limited to the order of processing shown in FIGS. 2 and 3. The blocks of FIGS. 2 and 3 may be rearranged, where appropriate, to perform the functions described herein.

Other implementations are within the scope of the following claims.

For example, process 100 may include dynamic adaptation. Specifically, each time a component is requested by the first server, the specific web content contained in the database 42 is checked for any updates to determine if the profile associated with the specific web content is still valid. This check is accomplished in one of several ways, such as expiry information, last modified dates, CRCs, MD5s, and so forth. Thus, a newly generated profile is used in real-time each time the component is requested.

In another example, process 100 stores a baseline profile and a number of deltas. The deltas contain information captured when the specific web content or the database 42 changes in any significant manner. Each delta adds more overall information about the specific web content and the first server.

What is claimed is:

1. A computer-implemented method comprising:
   scanning content of a source page in which a component is to be inserted, the source page being expressed in mark-up code, wherein scanning comprises scanning the mark-up code and attributes associated with components defined using the mark-up code in order to obtain information relating to a style of the source page as a whole;
   obtaining a profile based on the information obtained as a result of scanning the content of the source page, the profile identifying style of the source page; and
   generating a content component that is to be included in the source page in accordance with the profile, wherein generating comprises formatting the content component in accordance with the profile so that a style of the content component comports substantially to a style of the source page.

2. The method of claim 1, wherein the mark-up language is HyperText Markup Language (HTML).

3. The method of claim 1, wherein the content of the source page comprises contextual material including at least one of topical, geographical, temporal, and semantic characteristics.

4. The method of claim 1, wherein the content component comprises syndicated services including message boards, chat rooms, file exchanges, link exchanges, E-commerce, and/or auctions.

5. The method of claim 1, wherein the content component comprises syndicated content including news feeds, weather information, stock information, road maps, pictures, video, audio, and/or text.

6. The method of claim 1, wherein the content component comprises one or more elements to be embedded in the source page.

7. The method of claim 6, wherein the elements comprise syndicated textual or multimedia material shown within a context of the source page.

8. The method of claim 6, wherein the elements comprise stand-alone elements.

9. The method of claim 8, wherein the stand-alone elements comprise syndicated textual or multimedia material shown within a context in a browser window, dialog window, or pop-up window.

10. The method of claim 1, further comprising incorporating the content component in the source page by inserting script into the source page.

11. The method of claim 1, further comprising incorporating the content component in the source page by inserting one or more frames into the source page.

12. The method of claim 1, further comprising incorporating the content component in the source page by inserting one or more interior frames into the source page.

13. The method of claim 1, further comprising incorporating the content component in the source page by inserting one or more layers into the source page.

14. The method of claim 1, further comprising incorporating the content component in the source page by inserting one or more applets into the source page.

15. The method of claim 1, further comprising incorporating the content component in the source page by inserting one or more Active-X controls into the source page.

16. The method of claim 1, further comprising incorporating the content component in the source page by inserting one or more plug-ins into the source page.

17. The method of claim 1, further comprising incorporating the content component in the source page by inserting Java code into the source page.

18. The method of claim 1, wherein obtaining the profile comprises:
    analyzing the style of the content of the source page;
    analyzing the content of the source page; and
    saving information relating to the style and content of the source page as the profile.

19. The method of claim 18, wherein the profile is utilized as a filter that dictates content from the content component to include in the source page.

20. The method of claim 19, further comprising incorporating the content component into the source page by referencing the profile in real-time.

21. The method of claim 20, wherein referencing the profile in real-time comprises:
    checking the source page for updates; and
    updating the profile with at least one of the updates.

22. The method of claim 21, wherein checking comprises comparing pairs of expiry information, last modified dates, cyclic redundancy codes (CRCs) or MD5s.

23. One or more machine-readable media comprising instructions that are executable to cause one or more processing devices to:
    scan content of a source page in which a component is to be inserted, the source page being expressed in mark-up code, wherein scanning the content comprises scanning the mark-up code and attributes associated with components defined using the mark-up code in order to obtain information relating to a style of the source page as a whole;
    obtain a profile based on the information obtained as a result of scanning the content of the source page, the profile identifying a style of the source page; and
    generate a content component that is to be included in the source page in accordance with the profile, wherein generating comprises formatting the content component in accordance with the profile so that a style of the content component comports substantially to a style of the source page.

24. The one or more machine-readable media of claim 23, wherein the source page and the content component are expressed in HyperText Markup Language (HTML).

25. The one or more machine-readable media of claim 23, wherein the content of the source page comprises contextual material including topical, geographical, temporal and/or semantic characteristics.

26. The one or more machine-readable media of claim 23, wherein the content component comprises syndicated services including at least one of message boards, chat rooms, file exchanges, link exchanges, E-commerce, and auctions.

27. The one or more machine-readable media of claim 23, wherein the content component comprises at least one of syndicated content including news feeds, weather information, stock information, road maps, pictures, video, audio and/or text.

28. An apparatus comprising:
memory that stores instructions that are executable; and
at least one processing device that executes the instructions to:
scan content of a source page in which a component is to be inserted, the source page being expressed in mark-up code, wherein scanning the content comprises scanning the mark-up code and attributes associated with components defined using the mark-up code in order to obtain information relating to a style of the source page as a whole;
obtain a profile based on the information obtained as a result of scanning the content of the source page, the profile identifying a style of the source page; and
generate a content component that is to be included in the source page in accordance with the profile, wherein generating comprises formatting the content component in accordance with the profile so that a style of the content component comports substantially to a style of the source page.

* * * * *